United States Patent [19]

Halin et al.

[11] 4,437,783
[45] Mar. 20, 1984

[54] DEVICE FOR THE DETECTION OF THE POSITION OF THE THRUST REVERSER OF A TURBOJET ENGINE

[75] Inventors: Yves R. Halin, Melun; Rene M. J. Hersen, Combs la Ville, both of France

[73] Assignee: Societe Nationale d'Etude et de Construction de Moteurs d'Aviation, S.N.E.C.M.A., France

[21] Appl. No.: 286,886

[22] Filed: Jul. 27, 1981

[30] Foreign Application Priority Data

Aug. 11, 1980 [FR] France ............................. 80 17640

[51] Int. Cl.³ ............................................. F16B 1/00
[52] U.S. Cl. ..................................... 403/27; 292/201; 292/246; 60/226.2; 239/265.27; 244/110 B; 403/321
[58] Field of Search ................ 60/226 A; 239/265.27, 239/265.29, 265.31; 244/110 B, 173, 12.5, 23.0; 403/27, 322, 321, 327; 292/201, 246, 227; 70/438

[56] References Cited

U.S. PATENT DOCUMENTS

| | | |
|---|---|---|
| 2,923,127 | 2/1960 | Biehl et al. |
| 2,974,904 | 3/1961 | Fielding et al. |
| 3,034,296 | 5/1962 | Keen et al. |
| 3,460,762 | 8/1969 | Weise ............................. 239/265.29 |
| 3,618,880 | 11/1971 | Hagaman et al. .............. 244/110 B |

FOREIGN PATENT DOCUMENTS

| | | |
|---|---|---|
| 666798 | 11/1965 | Belgium . |
| 1514925 | 1/1968 | France . |
| 759891 | 10/1956 | United Kingdom . |
| 921917 | 3/1963 | United Kingdom . |

Primary Examiner—Cornelius J. Husar
Assistant Examiner—Joseph A. Fischetti
Attorney, Agent, or Firm—Bacon & Thomas

[57] ABSTRACT

Device for the detection of the position of the thrust reverser of a turbojet engine and its locking element, which includes an element integral with the moving part of the reverser, which cooperates with a mechanical locking device and a stationary electrical detection device for detecting the position of an element integral with the reverser and its locking device.

The locking device, mounted pivotingly on a support element has on one side of a pivoting axle an arm which is connected with a control cylinder and on the other side a strap having an axle which may be engaged by a hook of the element integral with the moving part of the reverser, moving in a rectilinear motion of translation, the locking device carrying another axle parallel to its pivoting axle and upon which a lever is articulated.

5 Claims, 13 Drawing Figures

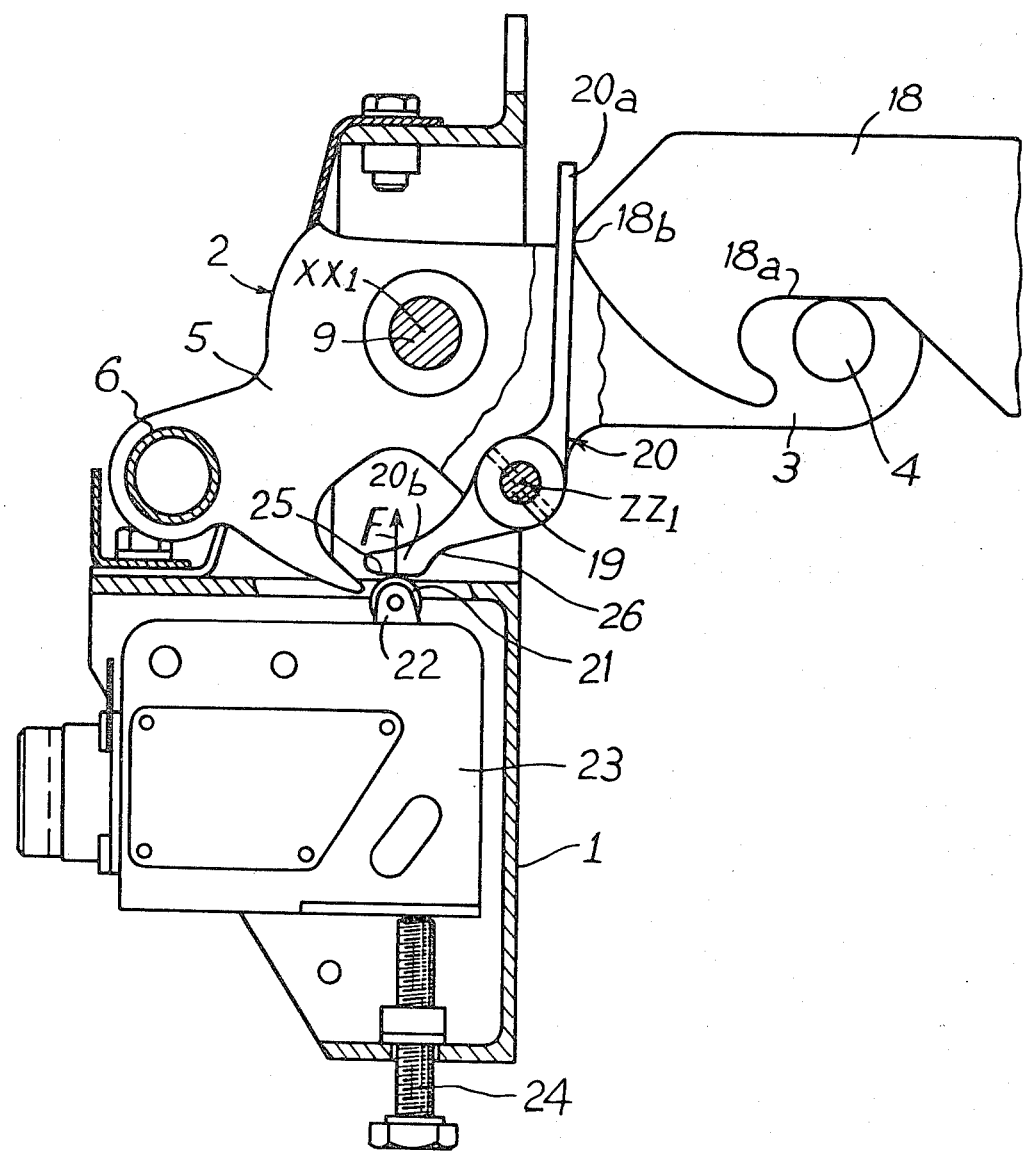

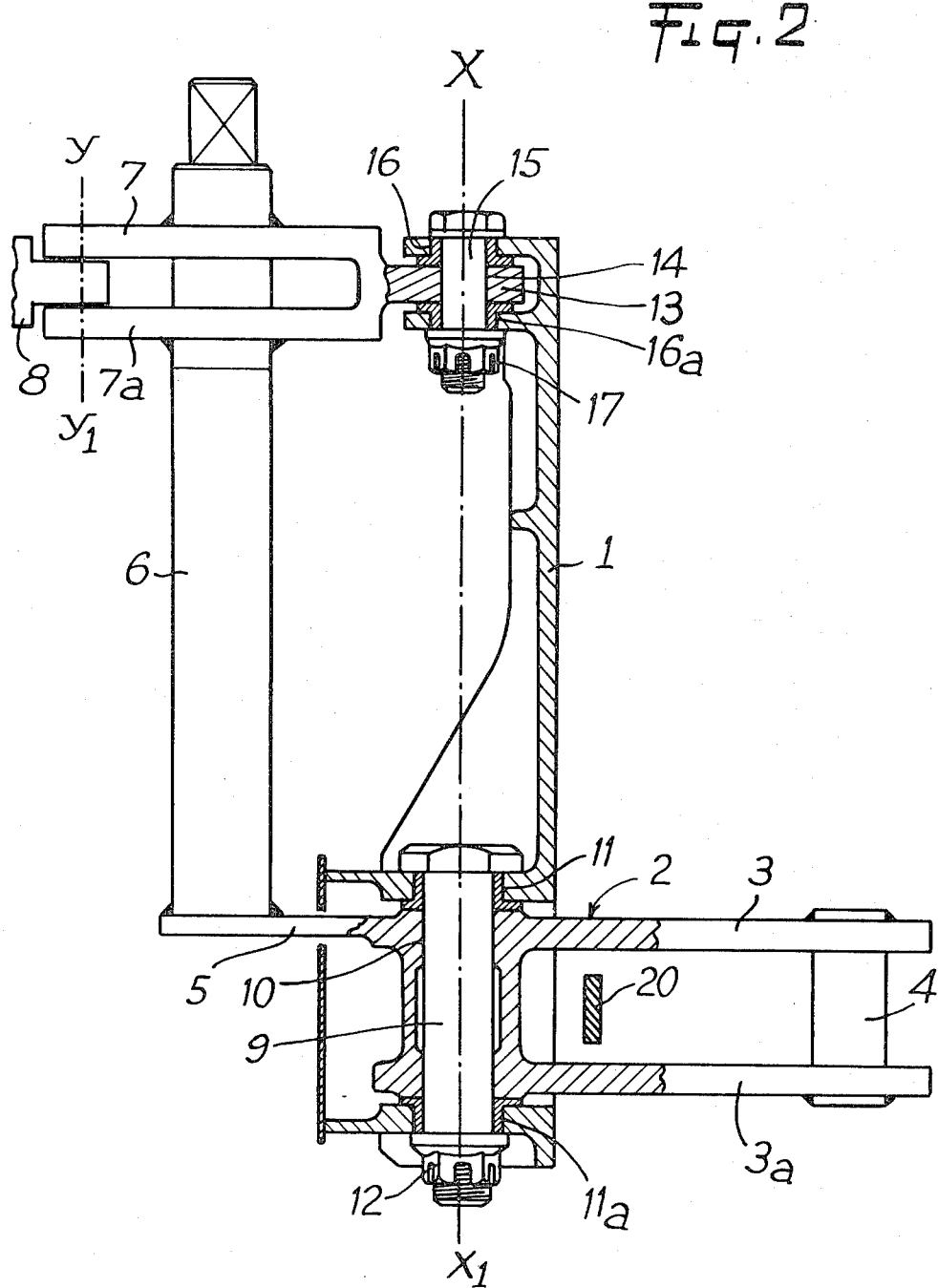

DEVICE FOR THE DETECTION OF THE POSITION OF THE THRUST REVERSER OF A TURBOJET ENGINE

BACKGROUND OF THE INVENTION

The present invention is in the field of devices to detect the position of the thrust reverser of a turbojet engine and of its locking.

In order to ascertain the locking of the moving part of a thrust reverser, use is generally made of a position detector microswitch.

When the moving part is in the retracted and in locked position, the electric circuit of the detector must be open and consequently a lamp indicating the locked state is extinct.

Any other configuration of the moving part or of the locking system must result in the closing of the electric circuit and thus in the lighting of the lock indicator lamp.

However, this device has the disadvantage in that it requires the mounting of a microswitch and its wiring on a moving piece.

The device according to the invention has the function of detecting in a more precise manner the position of two elements:

one corresponding to the position of the control device of the reverser, such that its lock is in the locked positon following the actuating of the retraction of the reverser transmitted to a locking actuator;

the other corresponding to a position of the moving part of the reverser, such that said moving part is in the terminal position of the path of retraction.

These two elements correspond to the "direct jet" position of a thrust reverser.

A certain number of means is further known, such as:

the provision of a mechanical locking device applied to a thrust reverser;

the detection of a retracted and locked device associated with an indicator lamp;

the placing of an electric detector on a stationary wall;

the provision of a mechanical detection function of the ET type, applied to two mobile elements.

However, the aforementioned devices are generally highly complex and do not always afford good accuracy.

SUMMARY OF THE INVENTION

According to the present invention, locking means mounted pivotally on a support element has on one side of the pivoting axle an arm connected with a control actuator and on the other, a strap having an axle capable of being engaged by a hook of the element integral with the moving part of the reverser in a rectilinear motion of translation, said locking means having an axle parallel to its pivoting axle, and upon which there is mounted a lever actuated by the hook and possessing two arms, one of which is capable of contacting the end of the hook and the other of which is in contact with a moving control element of the detector means.

The device according to the invention comprises a stationary electric detector, protected against the strong mechanical or impact forces that are produced during the engagement of the reverser and the locking means; this advantage is enhanced by the choice of the form of the part of the lever in contact with the detector, which makes it possible to obtain a progressive motion and rolling without jerking. The device is insensitive to different tolerances concerning the position of the reverser (inaccuracy of the position of the hook in the transverse direction, for example).

Furthermore, the device had great simplicity due to the use of a minimum number of pieces to effect the ET function; this improves the reliability which is remarkable in comparison with other solutions to this problem, employing electronic devices with a low degree of reliability in the prevailing environment (proximity detectors).

Finally, an elastic element of the detector exercises a force which applies a moment in the locking direction, which is favorable in view of safety and which makes it possible to prevent unlocking caused by a failure of the actuating device, for example, a breaking of the return spring.

BRIEF DESCRIPTION OF THE DRAWINGS

FIG. 1 is a side view of a device to detect the position of a thrust reverser according to the invention;

FIG. 2 is a front view and a partial cross section of the device according to FIG. 1;

DESCRIPTION OF THE PREFERRED EMBODIMENT

Figure 3A:
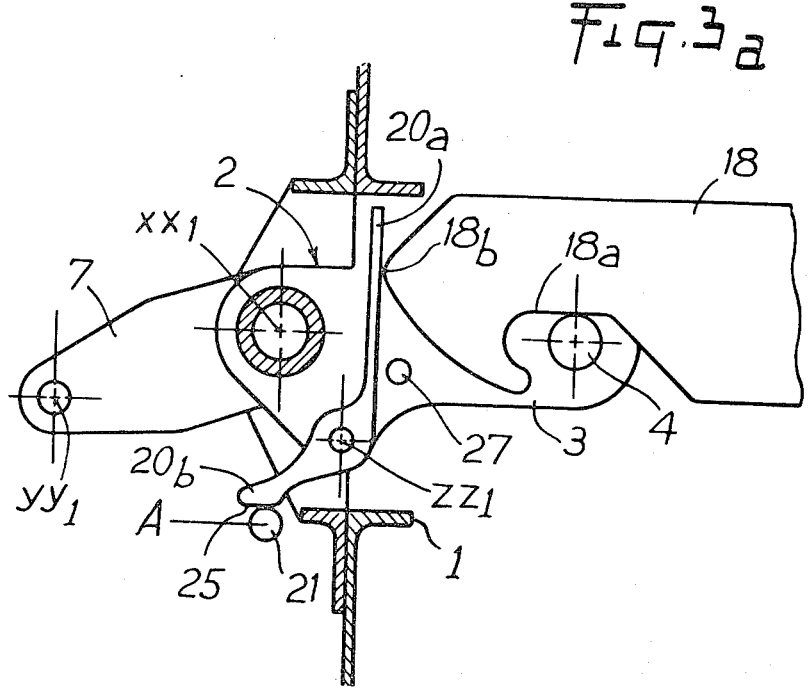
FIG. 3a is a side view of the device with the moving part retracted.

In FIGS. 1 and 2 there is shown an embodiment of a device to detect the position of the thrust reverser of a turbojet engine and of its locked state, the device comprising a stationary support element 1 upon which a locking means 2 is mounted pivoting on the axle $XX_1$, said locking means consisting of a strap with two arms 3, 3a, between which an axle 4 is secured. On the other end of the straps 3–3a, with respect to the axle $XX_1$, the locking means is extended by an arm 5, to which one end of a rod 6 is fastened with the other end being rigid with a second strap, the arms 7, 7a whereof are fixed on the rod 6 and between which, in an articulated manner by means of an axle $YY_1$, a rod 8 of a control cylinder is mounted.

The locking element 2 is mounted pivotally around the axle $XX_1$ on the support element 1 by means of a screw 9 engaged in a bore 10 of the locking element and in the rings 11, 11a integral with the support element 1. The screw 9 is equipped at one of its ends with a lock nut 12. The second strap 7, 7a is extended by a tab 13 having a bore 14, wherein a screw 15 is engaged, said screw 15 being mounted by means of the rings 16, 16a on the support element 1 and to which it is fastened by means of a nut 17. The screws 9 and 15 are coaxially with the axle $XX_1$, in order to assure the pivoting of the locking element assembly 2.

Between the arms 3–3a of the strap there may extend a hook 18 which is integral with the moving part of the reverser, not shown in the drawing, said hook having a recess 18a wherein the axle 4 may be engaged.

On an extension of the locking element 2 located adjacent to the straps 3, 3a, a screw 19 is fastened on an axle $ZZ_1$, parallel to the axle $XX_1$, with a lever 20 with two arms 20a, 20b being articulated around said screw 19, one of the arms 20a contacting the end 18b of the hook 18 and the other, 20b being in contact with a pulley 21 mounted rotatingly at the end of a moving element 22 of the control of an electric detection element 23 secured to the support element 1, the position of which may be regulated by means of a screw 24 mounted on the support element 1.

At its end in contact with the pulley 21, the arm 20b has a surface 25 adjacent a surface 26 defining a recess, said surfaces 25 and 26 ensuring the guidance of the pulley and controlling the displacement of the control element 22, which is urged by a spring, not shown, against said arm 20b of the lever 20, in accordance with the arrow F. The spring of the detector exercizes a force which applies a moment in the locking direction, which favors safety against unlocking caused by the failure of the control element, for example, the breakage of the return spring. This effect is, however, slight, because the force of the spring is weak.

In FIG. 3a, the device is shown in its nominal position, when the moving part is retracted, with the entirety of the elements contributing to the locking of the hook 18 and the moving part of the reverser. With the hook 18 being urged toward the left, its end 18b is in contact with the arm 20a of the lever 20, which maintains by its arm 20b the pulley 21 of the detector in position A, which corresponds to an open electric circuit and thus to the absence of a signal, in particular a light signal (lamp extinguished).

Figure 3B:
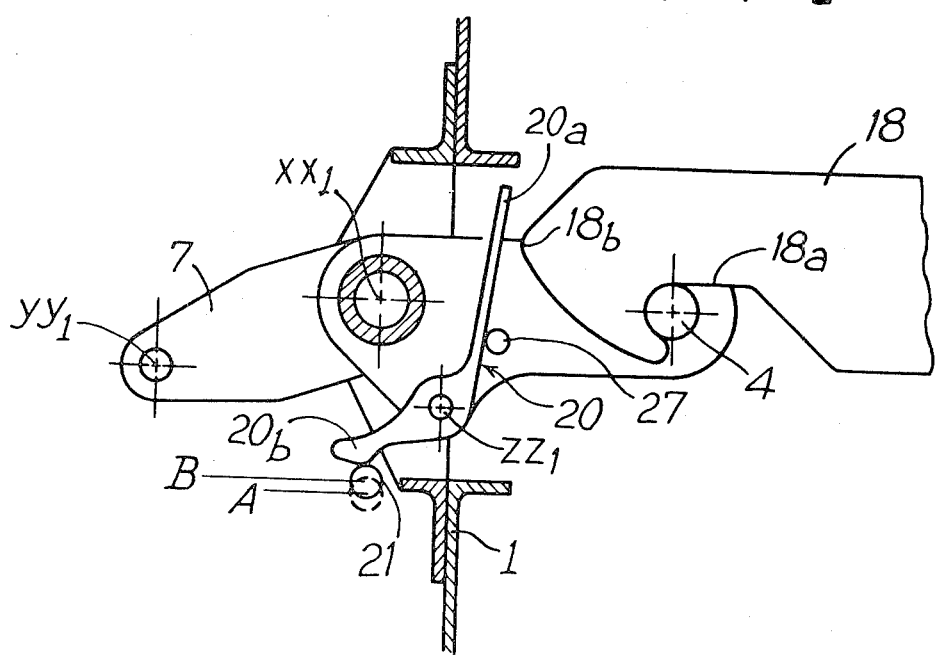
FIG. 3b is a side view of the device when the moving parts begin to extend without actuation.

If for any reason whatsoever, the moving part tends to be deployed without being actuated by the control, the hook 18 moves to the right and the axle 4 is engaged in the bottom of the recess 18a. The lever 20, which no longer is in contact with the end 18b of the hook 18, pivots around its axle $ZZ_1$, moved by the force of the spring of the detector, which acts according to the arrow F. The arm 20a is then resting against a stop 27 integral with the locking element 2 and the displacement of the lever 20 enables the pulley 21 to occupy a position B (FIG. 3b), for which the electric circuit is closed, thereby activating a light signal.

In FIGS. 4a to 4i, the operation of the device over an entire cycle is illustrated.

Figure 4A:
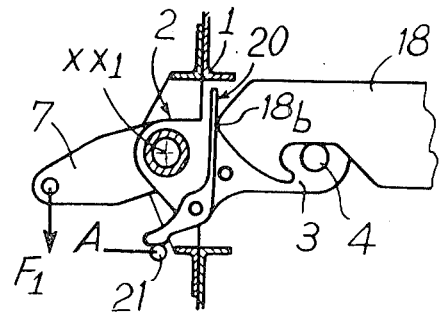
FIGS. 4a to 4i are views of the device, with each element shown in the course of a complete cycle.

In FIG. 4a, the device is in its nominal initial position described hereinabove and also shown in FIG. 3a; in this case the control cylinder applies a force F1 to the locking element 2.

Figure 4B:
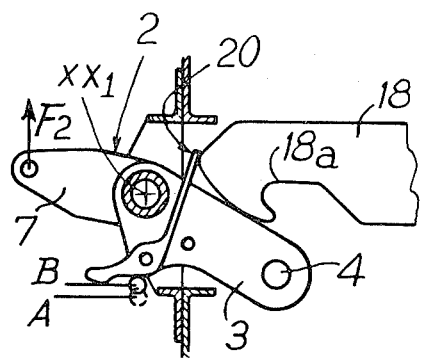

In FIG. 4b, the control cylinder is activated and it applies a force F2 to the locking element 2, which swivels around the axle $XX_1$, thereby releasing the hook 18 from the axle 4 mounted on said locking element. The hook 18, which is integral with the moving part, remains in its initial position, but is unlocked, because the moving part remains in its retracted position.

Figure 4C:
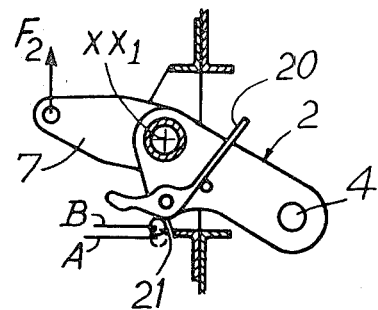

In FIG. 4c, the device is shown deployed and the hook 18, having been moved to the right, is no longer visible in the drawing.

Figure 4D:
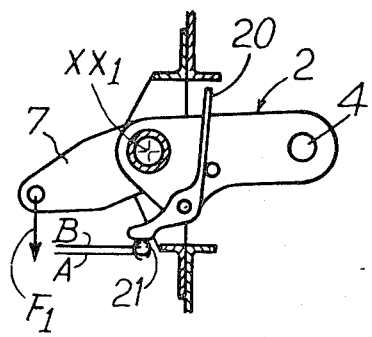

In FIG. 4d, which corresponds to the position of the extended moving part, the locking element is returned into the locking position by actuating the control cylinder, which applies a force F1 to it.

Figure 4E:
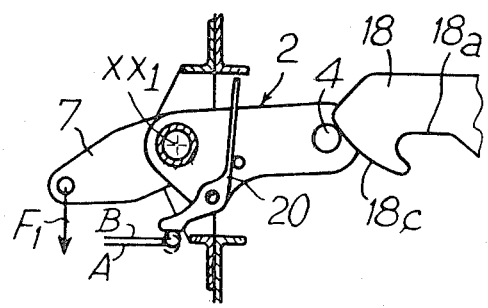
Figure 4F:
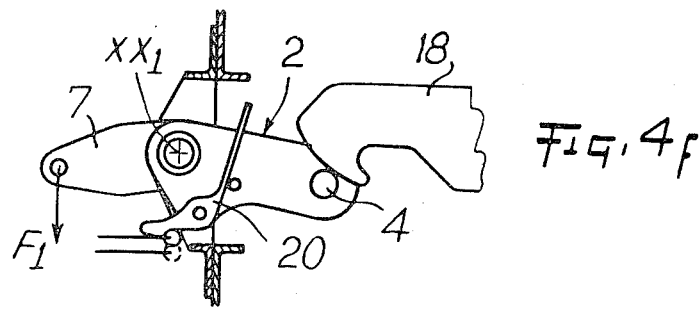
Figure 4G:
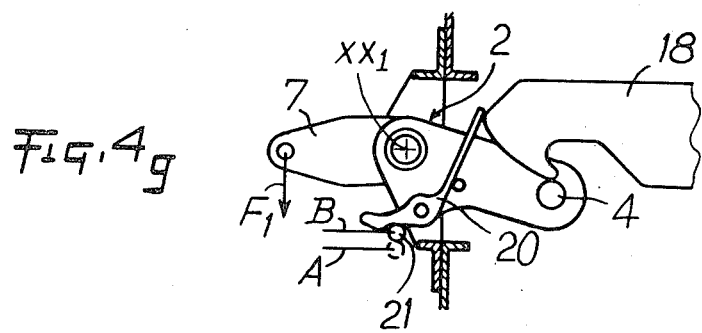

In FIG. 4e, the moving part has returned to its retracted position and the hook 18 rests against the axle 4 of the locking element 2. The axle 4 follows the slope 18c of the hook to the extent that the latter is displaced toward the left, as shown in FIGS. 4f and 4g.

When the axle 4 arrives at the end of the slope 18c of the hook 18, thereby allowing the locking element 2 to swivel around the axle $XX_1$, in the counterclockwise direction, under the action of the force F1, applied by the control cylinder.

Figure 4H:
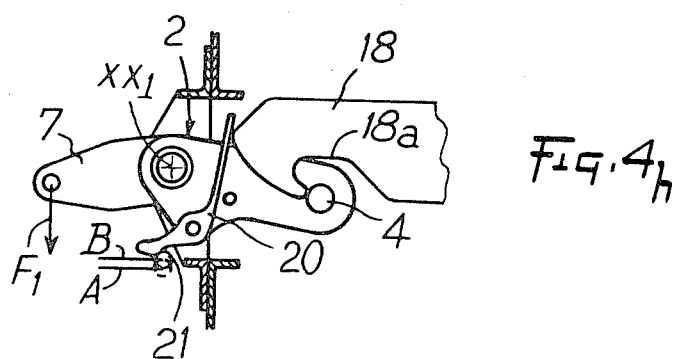
Figure 4I:
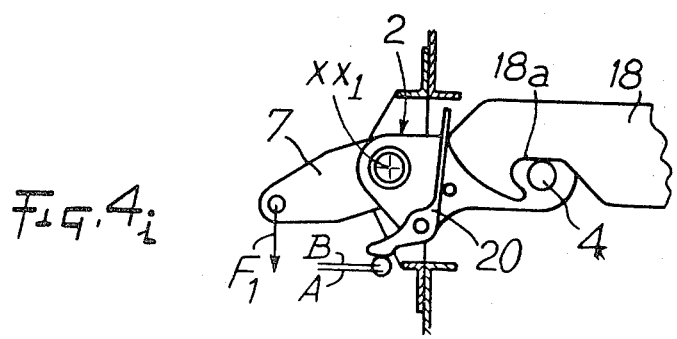

During the different phases of the operation shown in FIGS. 4b and 4i, the different elements are not in their nominal positions and the lever 20 always occupies a position wherein it cannot detect the simultaneous presence of the locking element 2 and the hook 18, i.e. perform an ET logic function.

For this reason, in the operational phases represented in FIGS. 4h to 4i, the pulley 21 is always in the position B, which corresponds to the closing of the circuit controlled by the detector 23 and in particular to the lighting of a luminous signal. The opening of the electric circuit is effected only when the hook 18 returns to the end of its course (FIG. 4a) and when its end 18b abuts against the arm 20a of the lever 20, the other arm 20b of which applies pressure against the pulley 21 which then again occupies the position A.

It should be understood that the description is not limiting and that a person skilled in the art would be able to apply modifications without exceeding the scope of the invneiton.

What we claim is:

1. A device to detect the position of a thrust reverser of a turbojet engine and its locking means, having a hook element integral with a moving part of the thrust reverser which moves in rectilinear translation, mechanical locking means and a stationary electric detection means for detecting the position of the hook element with respect to the mechanical locking means comprising: (a) a stationary support element; (b) locking means pivotally mounted on the stationary support element so as to pivot about a first axis, the locking means having an arm extending therefrom on one side of the first pivot axis, a strap extending therefrom on the opposite side of the first pivot axis, and an axle mounted on the strap so as to be engageable with the hook element; (c) control means connected to the arm to pivot the locking means about the first pivot axis; and (d) a lever pivotally mounted on the locking means to pivot about a second pivot axis which extends parallel to the first pivot axis, the lever having a first lever arm extending into the path of movement of the hook element and a second lever arm which actuates the electric detection means such that when the thrust reverser is in its locked position the hook element contacts the first lever arm to actuate the electric detection means.

2. Device according to claim 1 further comprising a stop mounted on the locking means against which the first lever arm may come to rest.

3. Device according to claim 1 wherein the second lever arm in contact with the electric detection means has a first surface adjacent a second surface defining a recess in which a control element of the electric detection means may be received.

4. Device according to claim 3 wherein the control element includes a pulley which is elastically biased against the first and second surfaces of the second lever arm.

5. Device according to claim 1 further comprising: (a) a rod having a first end attached to the locking means arm; (b) a second strap attached to the other end of the rod, the second strap having a tab pivotingly attached to the support element coaxially with the first pivot axis; and (c) means to attach the control means to the second strap.

* * * * *